US007689567B2

(12) United States Patent  (10) Patent No.: US 7,689,567 B2
Lock et al.  (45) Date of Patent: Mar. 30, 2010

(54) ERROR HANDLING FOR INTERMITTENTLY CONNECTED MOBILE APPLICATIONS

(75) Inventors: Hendrik Lock, Liedelsheim (DE); Dragon Matic, Odenheim (DE)

(73) Assignee: SAP AG, Walldorf (DE)

(*) Notice: Subject to any disclaimer, the term of this patent is extended or adjusted under 35 U.S.C. 154(b) by 363 days.

(21) Appl. No.: 11/647,902

(22) Filed: Dec. 28, 2006

(65) Prior Publication Data
US 2008/0163252 A1 Jul. 3, 2008

(51) Int. Cl.
G06F 17/30 (2006.01)
(52) U.S. Cl. .............................. 707/10; 707/1; 707/200; 790/217; 790/218; 790/226
(58) Field of Classification Search .................. 707/1, 707/10, 200; 709/217–218, 226
See application file for complete search history.

(56) References Cited

U.S. PATENT DOCUMENTS

| 5,963,642 | A  | * | 10/1999 | Goldstein | 713/193 |
| 6,122,379 | A  | * | 9/2000  | Barbir    | 380/269 |
| 6,477,143 | B1 | * | 11/2002 | Ginossar  | 370/230 |
| 7,171,690 | B2 | * | 1/2007  | Kouznetsov et al. | 726/22 |
| 7,181,017 | B1 | * | 2/2007  | Nagel et al. | 380/282 |
| 2001/0049286 | A1 | * | 12/2001 | Hansmann et al. | 455/435 |
| 2002/0118837 | A1 | * | 8/2002 | Hamilton | 380/277 |
| 2003/0105995 | A1 | * | 6/2003 | Schroath et al. | 714/48 |
| 2003/0140285 | A1 | * | 7/2003 | Wilkie | 714/48 |
| 2003/0233465 | A1 | * | 12/2003 | Le et al. | 709/231 |
| 2004/0218760 | A1 | * | 11/2004 | Chaudhuri | 380/217 |
| 2004/0224674 | A1 | * | 11/2004 | O'Farrell et al. | 455/418 |
| 2005/0044165 | A1 | * | 2/2005 | O'Farrell et al. | 709/213 |
| 2005/0076080 | A1 | * | 4/2005 | Arora | 709/203 |
| 2005/0085222 | A1 | * | 4/2005 | Przybilski et al. | 455/418 |
| 2005/0233767 | A1 | * | 10/2005 | Ayyeppen et al. | 455/557 |
| 2005/0259590 | A1 | * | 11/2005 | Brown et al. | 370/250 |

(Continued)

OTHER PUBLICATIONS

"Robust Speech Recognition over Mobile networks Using Combined Weighted Viterbi Decoding and Subvector based error Concealment"—Tan et al.—Speech and Multimedia Communication (SMC), Department of Communication technology, Aalborg Univeristy, Denmark, 9th International conference 2006, (pp. 1-4).*

(Continued)

Primary Examiner—Jean B. Fleurantin
Assistant Examiner—Anh Ly
(74) Attorney, Agent, or Firm—Kenyon & Kenyon LLP

(57) ABSTRACT

An intermittently connected mobile device asynchronously communicates with a middleware system for subsequent communication with a back-end system. Local data objects are given an inconsistent state when charged on the mobile device and the back-end system is not available for data validation. Due to the intermittent communication, a waiting period for possible validation may be hours, days, weeks, etc. If an error occurs, the mobile device then receives and maintains a list of the error notifications. Upon selection of an error notification, an error resolution process is executed on the mobile device so that the user can select between the local data object and the remote data object. If the back-end object is selected, the process terminates otherwise if the local is selected, the user is presented the interface to update the data object, which is again verified by the back-end system.

13 Claims, 3 Drawing Sheets

U.S. PATENT DOCUMENTS

| | | | | |
|---|---|---|---|---|
| 2005/0273521 | A1* | 12/2005 | Patrick et al. | 709/246 |
| 2006/0005063 | A1* | 1/2006 | Patrick et al. | 714/1 |
| 2006/0015944 | A1* | 1/2006 | Fields | 726/27 |
| 2006/0047665 | A1* | 3/2006 | Neil | 707/10 |
| 2006/0053112 | A1* | 3/2006 | Chitkara et al. | 707/9 |
| 2006/0168355 | A1* | 7/2006 | Shenfield et al. | 709/250 |
| 2006/0234743 | A1* | 10/2006 | Fritsch et al. | 455/514 |
| 2006/0259604 | A1* | 11/2006 | Kotchavi et al. | 709/223 |
| 2007/0061896 | A1* | 3/2007 | Ferguson | 726/30 |
| 2007/0192689 | A1* | 8/2007 | Johnson et al. | 715/700 |
| 2007/0271234 | A1* | 11/2007 | Ravikiran | 707/3 |
| 2008/0027968 | A1* | 1/2008 | Kfouri et al. | 707/102 |
| 2008/0082545 | A1* | 4/2008 | Roseborough et al. | 707/10 |

OTHER PUBLICATIONS

"Resolving feature convolution in middleware system"—Zhang et al.—Conference on Object Oriented Programming systems language and Applications, Proceedings of the 19$^{th}$ annual ACM SIGPLAN (Oct. 24-28, 2004) conference, (pp. 188-205).*

"The design and Applications of a Context service"—Lei et al.—ACM SIGMOBILE Mobile Computing and Communications review, vol. 6, issue 4 (Oct. 2002) (pp. 45-55).*

* cited by examiner

ERROR HANDLING FOR INTERMITTENTLY CONNECTED MOBILE APPLICATIONS

COPYRIGHT

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND

The present invention relates generally to mobile processing devices in intermittent communication with a back-end processing system and more specifically to the handling of errors of data objects in processing operations synchronized between the mobile device and the back-end system based on the intermittent communications.

In mobile processing environments, remote or handheld devices include significant amount of local processing power to conduct and facilitate various commercial transactions. By way of example, an order handling system may allow a sales person to place an order on a handheld device using local processing applications. This remote device may or may not be in wireless communication with the back-end processing system.

In these systems, the veracity of the data can be vital, for example if a person places an order for a particular item, it can be extremely important to know or validate the inventory level or even possibly the naming of the item to insure the accuracy of the original agreement as well as the smooth transaction of any subsequent commercial transaction, including the proper delivery of the requested goods.

The mobile device may be out of communication with the back-end processing system for any number of a variety of reasons. For example, the mobile device may not recognize a wireless signal or may disable the wireless communication to save power. In these existing systems, it is also common to utilize a middleware component to facilitate the interaction of the remote device to the back-end system. As recognized by one skilled in the art, the middleware provides the intermediary, where the mobile device communicates with the middleware component and the middleware component thereupon communicates with the back-end processing device.

If the mobile device sends data updates to the back-end system, the validation of the data from the mobile device may fail. This error information is sent back to the client, but due to asynchronous communication, the mobile device may not receive the error information for an extended period of time. In this time period, the user continues to use the mobile device, even possibly applying further changes to the potentially erroneous data.

If the back-end system returns an error, the requested data change is not effective on the back-end system and also not effective on the middleware device. The middleware device has a consolidated data storage device that can detect data value changes by the back-end system and changes by the clients. Additionally, the middleware can also detect if the client changes are outdated relative to the back-end server changes.

In this architecture, the back-end is the master system, which thereby defines the conditions of the consistency of the data. In particular, the back-end system determines which data is the most recent and valid data. The middleware system also utilizes a "first one wins" policy when comparing inconsistent data between the mobile device and the back-end system. Based on this, any data changes in the back-end system are given higher priority over the changes in the middleware system.

If a data object is being concurrently changed on the back-end system and the middleware system, such as through one or more mobile devices, this can be problematic. In existing systems, any changes to data objects are sent from the mobile device to the middleware system through a message. After this message is sent, the object on the mobile device is set to an inconsistent state. The middleware device then processes the message and replicates the change to the back-end system. Concurrently, the mobile device continues its normal operations using this data in an inconsistent state.

The next synchronization after the middleware device processes the object, the mobile device receives a response message including the most recent state of the object on the back-end system. Based on this message, the mobile device converts the data object to either a consistent state or a rejected state if there is an error on the back-end system.

DETAILED DESCRIPTION

Error handling problems associated with intermittently connected remote devices can be controlled through the effective management of the states of various data fields. Through a middleware system, a data object can be given one of several different states. This data object state can be maintained on the remote device and when communication is made with the middleware component, the data object information can be transmitted to the middleware and subsequently to the back-end system. The back-end system verifies the data and if an error is found, the error can be reported back to the remote device. In the remote device, when an error state is noted for a particular data object, an error resolution routine can be implemented, whereby the user can selectively manage the data object having an error associated therewith.

Figure 1:
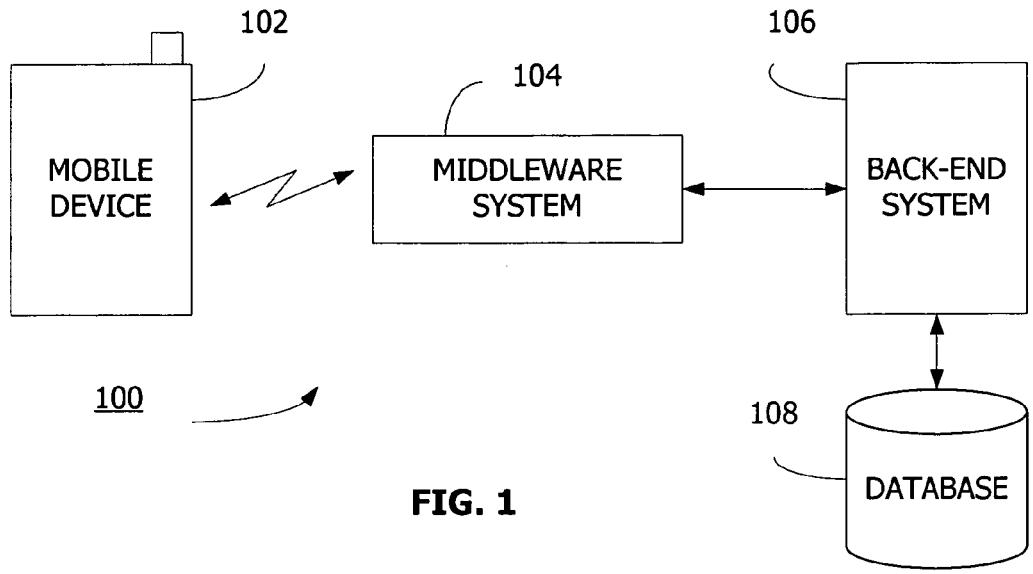
FIG. 1 illustrates one embodiment of a system with intermittent communication between a remote device and a back-end system, including error handling.

FIG. 1 illustrates a system 100 that allows for error correction in an intermittently connected mobile device. The system 100 includes a mobile device 102, a middleware processing system 104, a back-end system 106 and a database 108. As described in further detail with respect to FIG. 2, the mobile device 102 may be any suitable mobile device including processing capabilities for running local programs or applications and communicating user-input information to the middleware system 104. The middleware processing system 104 may be one or more processing devices executing software processing instructions for performing middleware operations, including facilitating communication between the mobile device 102 and the back-end system 106.

The back-end system 106 may be one or more processing devices or systems executing a back-end processing application, such as an enterprise application for example. The database 108 may be any suitable storage device or devices accessible by the back-end system for managing data objects relating to the underlying back-end processing application executed by the system 106.

It is recognized that for the sake of brevity, numerous elements have been omitted from FIG. 1. For example, the mobile device 102 may wirelessly communication with the middleware system 104 and the middleware system 104 also directly communicates with the back-end system, whereby various communication-related elements have been omitted as recognized by one having ordinary skill in the art.

Figure 2:
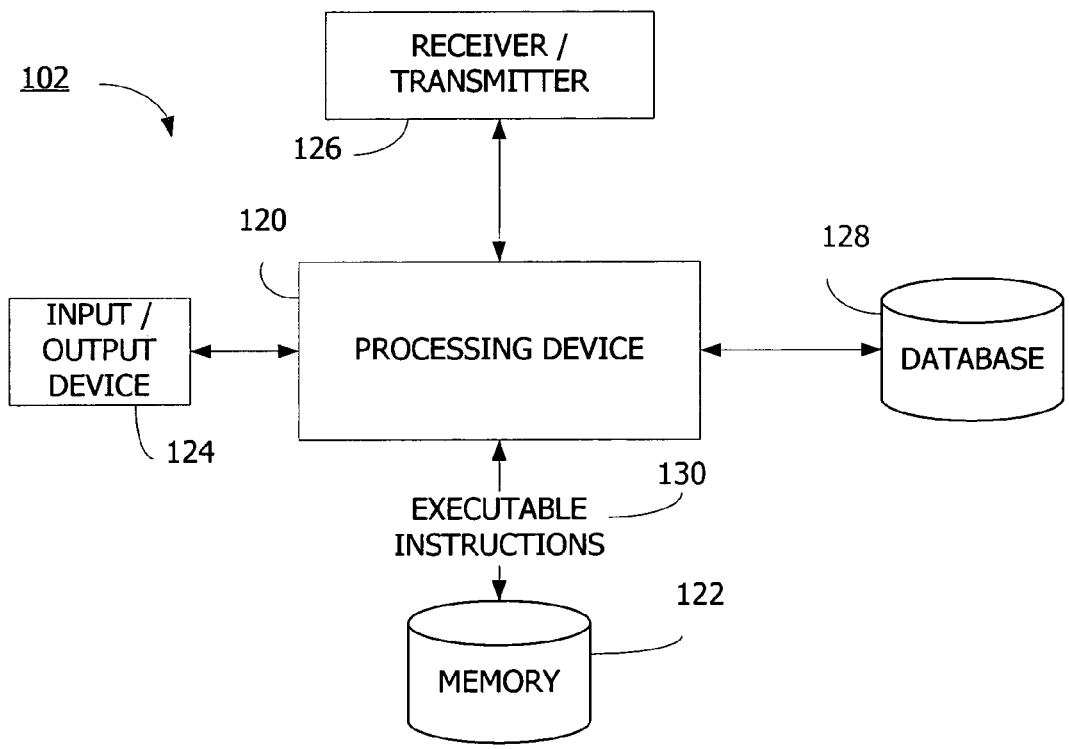
FIG. 2 illustrates another embodiment of a system with intermittent communication between a mobile device and a back-end system, including error handling.

FIG. 2 illustrates a more detailed embodiment of the mobile device 102 of FIG. 1. The mobile device 102 includes a processing device 120, a memory device 122, an input/output device 124, a receiver/transmitter 126 and a storage database 128. The processing device 120 may be one or more processing elements operative to perform processing operations in response to executable instructions 130 received from the memory 122. The input/output device 124 may be any suitable device or devices allowing for user input and subsequent user output, for example a keypad and a screen or a touch-screen. The receiver/transmitter may be one or more components allowing for communication between the mobile device 102 and the middleware system (104 of FIG. 1), such as using a wired or wireless transmission technique. The database 128 may be a local data storage device operative to store object data as used by the processing device 120 in executing the local applications in response to the executable instructions 130.

Referring back to FIG. 1, the mobile device 102 is in intermittent communication with the middleware system 104. The intermittent communication may be from the mobile device user and the mobile device 102 being outside of a communication zone, the communication being inactive to conserve battery power, among other scenarios. As connectivity should not restrict the user from using the mobile device 102, the user may enter information on the mobile device, such as through the input/output device 124 of FIG. 2.

In an exemplary embodiment, the user may enter product information in an ordering scenario. For example, a buyer may request to purchase a requested number of items, the seller using the mobile device 102 may locally enter the order information on the mobile device, such as using the input device 124. Through a local processing application on the processing device 120, this order information is received, processed and stored in the database 128. When the receiver/transmitter 126 is in communication with the middleware system 104, the new or updated information may be transmitted thereto. Although, until the active communication is established, the mobile device 102 allows the user to continue to engage in the business-related activities. In the mobile device 102, the changed data object is set to an inconsistent state and stored in a queued data message for transmission to the middleware device 104.

Referring back to FIG. 1, the middleware system 104 is in communication with the back-end system 106. When the middleware system 104 is in communication with the mobile device 102, the middleware system 104 receives a data message with the updated data objects from the mobile device 102. The middleware system 104 processes the data message, extracting the updated data object and submits the data object to the back-end system 106. The system 106 verifies this object against stored data in the database 108. If there are no errors, the process continues in accordance known operating techniques, where the back-end system may thereupon process the order and send a verification message to the mobile device 102 through the middleware system 104.

Although, should the data object cause an error, the back-end system 106 generates an error message and sends this error message to the mobile device 102 through the middleware system 104. The mobile device 102 receives the update to the object status as being rejected. The mobile device 102 also maintains a list of objects in the rejected state, such as being stored in the local database 128.

In the mobile device 102, the user may then navigate through the list of objects in the rejected state. This navigation may be performed using a standard interface application running on the processing device 120 in response to input commands received through the input device 124. The user may thereupon select an object from the list and start an error resolution process. This error resolution process includes the display of the current local data of the object compared against the server data of the object from the back-end system 106. As the database 128 stores the local data and receives the server data from the middleware 104, this error resolution process may be executed when the mobile device 102 is out of active communication with the middleware system 104. It is also noted that in one embodiment, the mobile device 102 may automatically operate the error resolution process upon receipt of an object having a rejected state instead of waiting for user activation.

In this error resolution process, the user can select which object data to use, either the data of the local data object or the back-end object of the remote data object. If the user selects the back-end object, the error resolution process is complete and may be terminated because the error is resolved relative to the back-end system. Additionally, if the back-end server data is selected, the local data of the object is replaced by the back-end server data and the state of the local object is changed to a consistent status.

If the user chooses the local data, the state of the object changes to an inconsistent state, which indicates that the local object is different from the object as stored on the back-end system 106. The inconsistent status further indicates that the object will be adjusted on the mobile device 102 and that the object is to be once again synchronized with the back-end system 106.

In the error resolution process, the user may thereupon update the object to resolve the error. For example, an error may be an identifier or name term that is inconsistent with the back-end records. The user may be given the option to update or change a particular term that avoids or overcomes the error. By way of further example, suppose a first user entry includes the data object of an order type having a location identifier of 1000, but the location identified by identifier does not allow the particular material entered in the remote device. Through the error resolution process, the user may thereupon select the local data object and update the object to reflect a new location identifier, such as location identifier 1001.

When the user updates the data object, the mobile device 102 saves the updated object and processes the object through the middleware system 104 to the back-end system 106. Once again, due to the asynchronous nature of system 100, the updated data object is sent in a data message when the mobile device 102 returns to operative communication with the middleware system 104. Once again, the middleware system 104 processes the data object to the back-end system 106, which checks the data object. If the object elicits another error, the process described above can be repeated, otherwise if the object is accepted, the middleware 104 thereby updates the mobile device 102 of the consistent nature of the object, when the mobile device 102 returns to communication with the middleware system 104.

Figure 3:
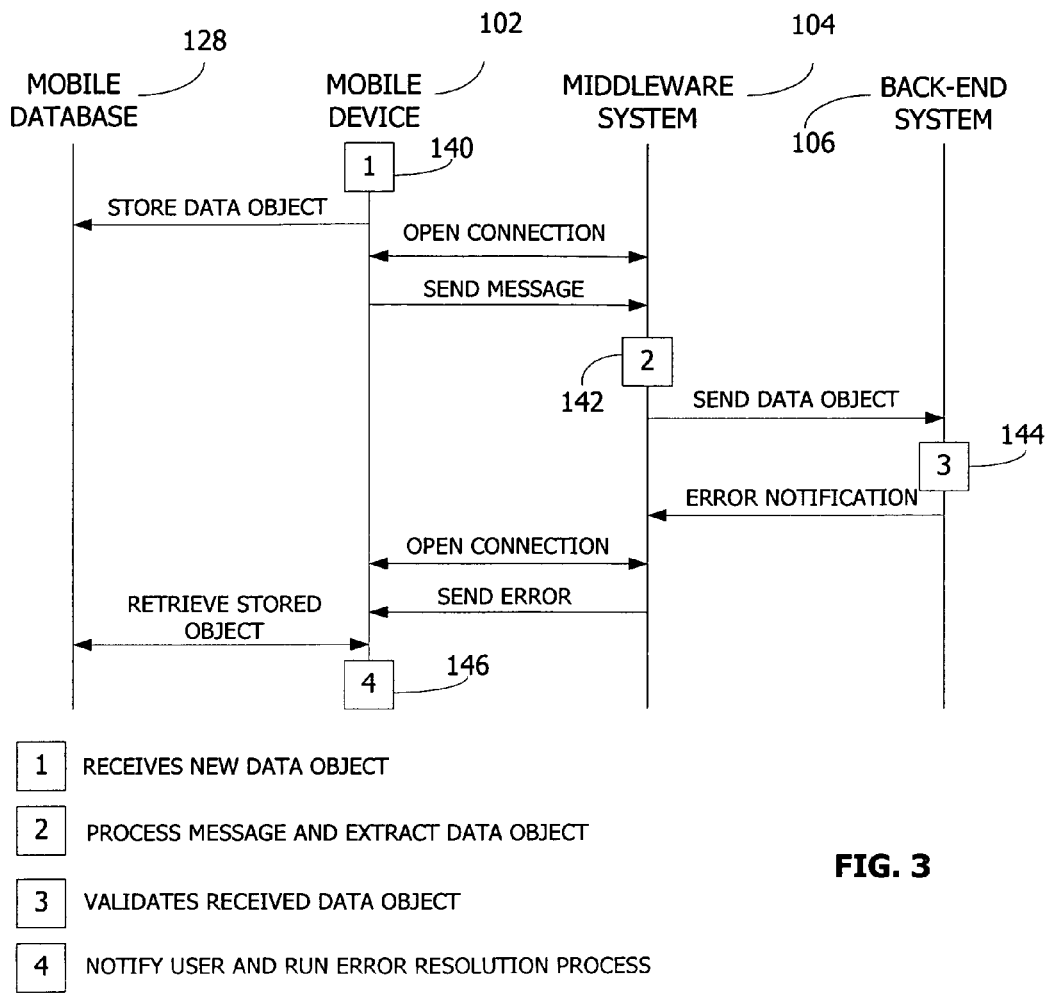
FIG. 3 illustrates a data flow diagram of one embodiment of a technique for error handling for a mobile device in intermittent communication with a back-end system.

FIG. 3 illustrates one embodiment of a data flow diagram between the mobile database 128, mobile device 102, middleware system 104 and back-end system 106. In the flow of data, a first event 140 is the receipt of a new data object, indicated by block one. The new data object may be received by a user entering information in the mobile device 102 as described above. After the data object is entered, the mobile device 102 stores the data object in the database 128.

When a connection is opened between the mobile device 102 and the middleware 104, the mobile device 102 sends the message with the data object therein to the middleware system 104. The middleware system 104 processes the message and extracts the data object therefrom, as indicated by block two 142. The extracted data object is then sent to the back-end system. The back-end system validates the received data object as indicated by block three 144 to determine if there is an error with the object.

If an error occurs, an error notification is generated and sent to the middleware system 104 and queued therein. Once an open connection is established, the middleware system can therein transmit the error message to the mobile device 102. The mobile device 102 thereupon retrieves the locally stored object, notifies the user of the error and runs the error resolution process.

Figure 4:
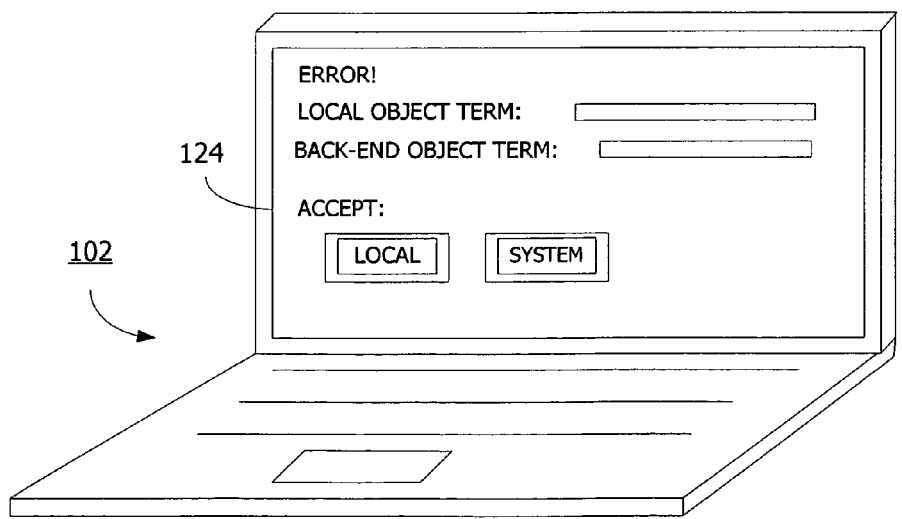
FIG. 4 illustrates one exemplary embodiment of a mobile device including a sample screenshot executing an error recovery process.

FIG. 4 illustrates a sample display of a mobile device 102, which in this example is a wireless enabled laptop computer. It is recognized that other suitable mobile devices may be utilized, such as a personal digital assistant or other hand-held device by way of example. As described above, the mobile device 102 executes the application software allowing for a user to contemporaneously enter information therein and the mobile device further includes the ability to periodically communicate with a middleware system and transfer data messages therebetween.

In the exemplary display of FIG. 4, the output device 124 includes a sample onscreen display that is activated by the error resolution process. The screen includes a notification that an error has occurred with a data object processed in the back-end system. Prior to this display, a visual display allows the user the ability to scroll through an active list of rejected data objects.

In this example, the display 124 includes the local object term and the back-end object term. This exemplary display provides a visual comparison of these two terms. The user, in viewing these two data terms, may then be able to accept either the local data or back-end object. As described herein, the selection of the back-end object overcomes the error by overwriting the local term with the system term and the selection of the local term provides the user a chance to modify the rejected object. Otherwise, as described in further detail below, the user may be afforded the chance to update the local data to overcome the error status.

Figure 5:
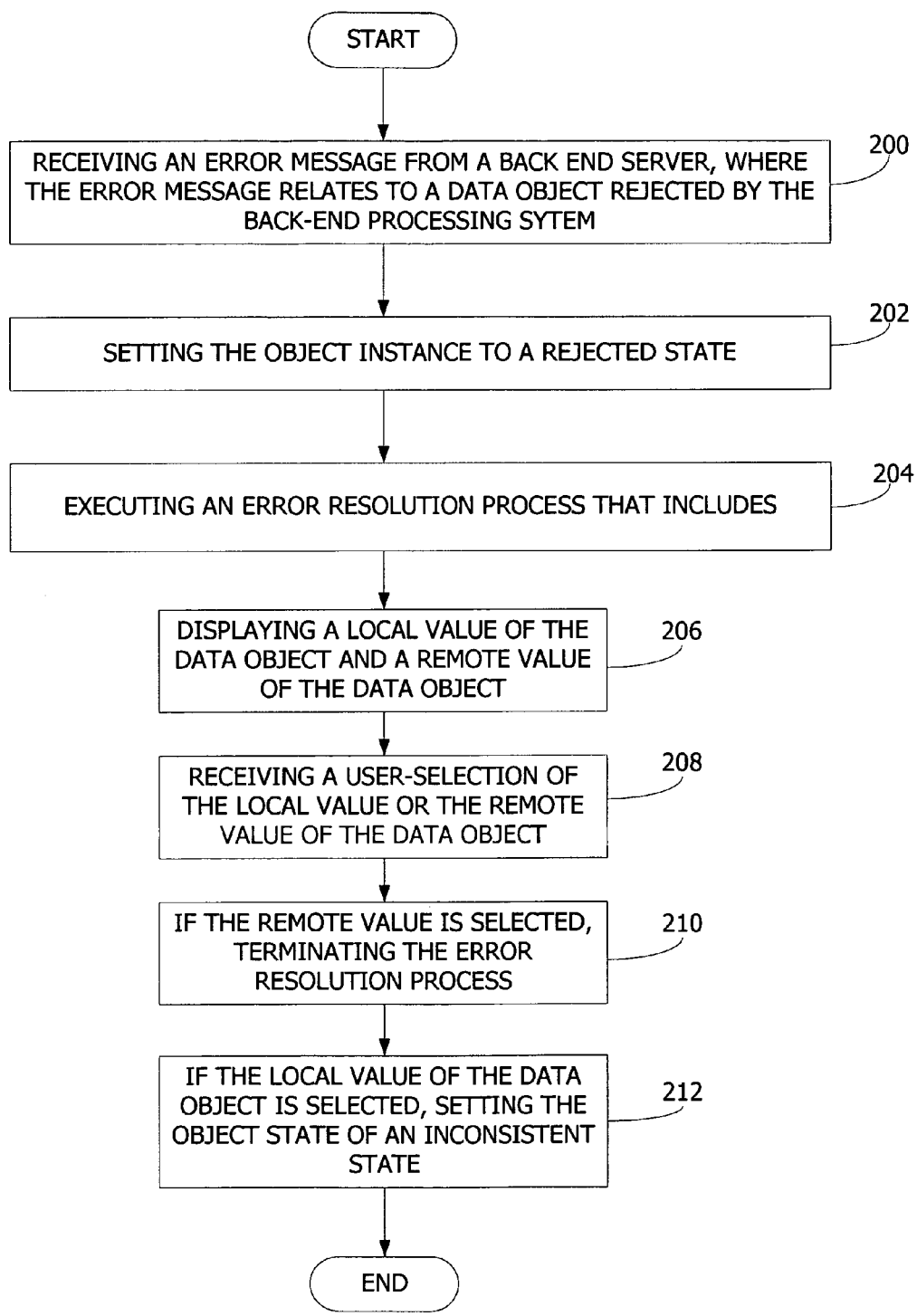
FIG. 5 illustrates a flowchart of the steps of one embodiment of a method for error handling with an intermittently connected remote device.

FIG. 5 illustrates a flowchart of the steps of one embodiment of a method for error handling in an intermittently connected mobile application. In one embodiment, the method begins, step 200, by receiving an error message from a back-end server, where the error message relates to a data object rejected by the back-end processing system. As described above, the data object is previously received by the back-end system through the middleware system from the mobile device. The data object was originally entered by the user and upon mobile communication, the data object is provided to the middleware and subsequently examined by the back-end system.

In one embodiment, the next step, step 202, is setting the data object to a rejected state. Previously the data object is set to an inconsistent state based on the user-entered data object awaiting validation from the back-end system. In this case, the data object is not validated because an error has been found, therefore the state is changed from inconsistent to rejected.

In one embodiment, the next step, step 204, is executing an error resolution process. This error resolution process includes steps 206 through 212 as discussed below. The first step of the process, step 206, includes displaying a local state of the data object and a remote state of the data object. By way of example, the sample display 124 of the mobile device 102 of FIG. 4 includes the display of the local value of the data object and the remote value of the data object. The next step, step 208, includes receiving a user-selection of the local value or the remote value of the data object.

In the error resolution process, if the remote value is selected, the process is terminated as the error has been resolved and the data from the back-end system overwrites the previously local value and the state changes to a consistent state, step 210. Although, if the local state of the data object is selected, the process includes setting the object state to an inconsistent state, step 212.

In this inconsistent state, the user is then provided the opportunity to update or otherwise correct the data object. The user may then enter new information or otherwise amend the data object. Similar to the operations from which the previous error notification arose, the mobile device stores the updated data object in a data message. When the mobile device is in communication with the middleware system, the data message is transmitted thereto and subsequently forwarded to the back-end system. The back-end system once again compares the data object and determines if an error has occurred. If another errors occurs, the procedure of steps 200-212 may be repeated. If the updated data object does not generate an error, the local state of the data object is adjusted from an inconsistent state to the consistent state when the mobile device 102 is back within communication with the middleware system 104 and available to receive the validation message.

Therefore, the above-described system allows for error handling in an intermittently connected mobile device. The updating of local state fields for various data objects allows the mobile device to maintain the status of the different data objects. Additionally, the back-end system is afforded the ability to validate the data object and this validation is reflected back to the mobile device upon reconnection. The mobile device includes the error resolution process, allowing for the user to maintain control over the erroneous data objects instead of previous automated overwriting operations. Thereby, users are provided a greater degree of usability on intermittently connected mobile devices without having the usability of these mobile devices restricted based on available connectivity to the middleware system or the back-end system.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. A computer-implement method for error handling in an intermittently connected mobile application, the method comprising:
   (i) storing, by a processor, a local data object in a local data storage device;
   (ii) setting, by the processor, the local data object to an inconsistent state;
   (iii) transferring, by the processor, the local data object to an outgoing message queue;
   (iv) checking, by the processor, for a communication link between the mobile application and a back-end processing system;
   (v) upon detection of the communication link, transmitting, by a transmitting device, a data message to the back-end processing system, the data message including the data object from the outgoing message queue, wherein the mobile application is operative to perform other operations when the communication link is not available;
   (vi) responsive to the back-end processing system rejecting the local data object, receiving, by a receiving device, an error message from a back-end server;
   (vii) setting, by the processor, the local data object to a rejected state;
   (viii) executing, by the processor, an error resolution process including:
   displaying the local data object and a remote data object;
   receiving a user-selection of the local data object or the remote data object;
   when the remote data object is selected, replacing the local data object with the remote data object in the local data storage device and terminating the error resolution process; and
   when the local data object is selected, receiving a user adjustment to the local data object and repeating steps i-viii,
   wherein displaying of the local data object and the remote data object is based on retrieving the data objects from the local storage device.

2. The computer-implemented method of claim 1 wherein the data message is transmitted through a middleware application.

3. The computer-implemented method of claim 1 wherein the data message is transmitted from a remote device.

4. The computer-implemented method of claim 1 wherein during the error resolution process, when remote data object is selected, the method further comprises setting, by the processor, the local data object to a consistent state.

5. The computer-implemented method of claim 1 wherein during the error resolution process, when the local data object is selected, the method further comprises displaying a user input screen for receiving the user adjustment to update the local data object.

6. A mobile device with an intermittently connected mobile application, the mobile device comprising:

a receiving device and a transmitting device, both, in intermittent operative communication with a back-end server;
a memory device including executable instructions; and
a processing device, in response to the executable instructions, operative to:
(i) store a local data object in a local data storage device;
(ii) set the local data object to an inconsistent state,
(iii) transfer the local data object to an outgoing message queue;
(iv) check for a communication link between the mobile application and a back-end processing system;
(v) upon detection of the communication link, transmit, by the transmitting device, a data message to the back-end processing system, the data message including the data object from the outgoing message queue, wherein the mobile application is operative to perform other operations when the communication link is not available;
(vi) responsive to the back-end processing system rejecting the local data object, receive, by the receiving device, an error message from a back-end server;
(vii) set the local data object to a rejected state;
(viii) execute an error resolution process including:
displaying the local data object and a remote data object;
receiving a user-selection of the local data object or the remote data object;
when the remote data object is selected, replacing the local data object with the remote data object in the local data storage device and terminating the error resolution process; and
when the local data object is selected, receiving a user adjustment to the local data object and repeating steps i-viii,
wherein the processing device is operative to display the local data object and the remote data object based on retrieving the objects from the local data storage device.

7. The mobile device of claim 6 wherein the data message is transmitted through a middleware application.

8. The mobile device of claim 6, wherein the processing device is further operative to, during the error resolution process, when remote data object is selected, the method further comprises set the local data object to a consistent state.

9. The mobile device of claim 6 further comprising:
an input device; and
wherein the processing device is further operative to, during the error resolution process, if when the local data object is selected, the method further comprises display a user input screen for receiving the user adjustment to update the local data object.

10. A wireless computing system having a mobile device with an intermittently connected mobile application, the mobile device comprising:
a back-end processing system including, a back-end processing device and a back-end server;
a middleware processing system including a middleware processing device; and the mobile device including:
a receiving device and a transmitting device, both, in intermittent operative communication with the back-end server;
a memory device including executable instructions; and
a processing device, in response to the executable instructions, operative to:
(i) store a local data object in a local data storage device;
(ii) set the local data object to an inconsistent state;
(iii) transfer the local data object, to an outgoing message queue;

(iv) check for a communication link between the mobile application and the back-end processing system;
(v) upon detection of the communication link, transmit, by the transmitting device, a data message to the back-end processing system, the data message including the data object from the outgoing message queue, wherein the mobile application is operative to perform other operations when the communication link is not available;
(vi) responsive to the back-end processing system rejecting the local data object, receive, by the receiving device, an error message from a back-end server;
(vii) set the local data object to a rejected state;
(viii) execute an error resolution process including:
displaying the local data object and a remote data object;
receiving a user-selection of the local data object or the remote data object;
when the remote data object is selected, replacing the local data object with the remote data object in the local data storage device and terminating the error resolution process; and
when the local data object is selected, receiving a user adjustment to the local data object and repeating steps i-viii, wherein the processing device is operative to display the local data object and the remote data object based on retrieving the objects from the local data storage device.

11. The system of claim 10 wherein the data message is transmitted through a middleware application executable on the middleware processing device.

12. The system of claim 10, wherein the processing device of the mobile device is further operative to, during the error resolution process, when remote data object is selected, the method further comprises set the local data object to a consistent state.

13. The system of claim 10 wherein the mobile device further includes:
an input device; and
wherein the processing device is further operative to, during the error resolution process, if when the local data object is selected, the method further comprises display a user input screen for receiving the user adjustment to update the local data object.

* * * * *